United States Patent [19]
Fink et al.

[11] 3,774,977
[45] Nov. 27, 1973

[54] ANTISKID BRAKE CONTROL SYSTEM

[75] Inventors: Werner Fink, Dieter Kircher, both of Frankfurt, Germany

[73] Assignee: ITT Industries, Inc., New York, N.Y.

[22] Filed: Mar. 21, 1972

[21] Appl. No.: 236,725

[30] Foreign Application Priority Data
May 7, 1971   Germany................... P 21 22 545.6

[52] U.S. Cl................................. 303/21 P, 303/20
[51] Int. Cl................................................. B60t 8/12
[58] Field of Search.................. 188/181 A; 303/20, 303/21; 324/162; 340/262

[56]   References Cited
   UNITED STATES PATENTS

| | | | |
|---|---|---|---|
| 3,637,264 | 1/1972 | Leiber et al. | 303/20 X |
| 3,556,610 | 1/1971 | Leiber | 303/20 X |
| 3,663,070 | 5/1972 | Scharlack | 303/20 X |
| 3,640,588 | 2/1972 | Carp et al. | 303/20 X |

Primary Examiner—Milton Buchler
Assistant Examiner—Stephen G. Kunin
Attorney—C. Cornell Remsen, Jr. et al.

[57] ABSTRACT

This invention relates to an antiskid brake control system wherein the control member contained in the brake circuit adjusts the brake pressure in the brake circuit in response to three different signal combinations each of the signals of each of the signal combinations are different signals derived from the deceleration signal present at the output of a deceleration sensor cooperatively mounted with respect to a wheel of a motor vehicle. The control system of the present invention reduces to a minimum the oscillations of the wheel suspension and the wheel axis generated by the antiskid control systems of the prior art and does not respond to the transient oscillations present in the control cycles of the prior art following the first control cycle and thereby eliminates the transient oscillation from the control signals controlling the control member in the brake circuit.

10 Claims, 6 Drawing Figures

ANTISKID BRAKE CONTROL SYSTEM

BACKGROUND OF THE INVENTION

The invention relates to an antiskid brake control method and system, especially for motor vehicles, which influences the brake pressure in the brake cylinders of the brake circuit as a function of the rotational deceleration of a wheel.

According to suggestions from the prior art relating to antiskid control systems for motor vehicles the brake pressure should be decreased when exceeding a certain deceleration value of a wheel as measured by a sensor, and the brake pressure should be built up again when the wheel deceleration falls below the certain deceleration value. During this process, however, the wheel very quickly re-entered the critical deceleration range so that the control cycles had to be in quick succession, and there was the danger of co-vibrations at the vehicle. Due to the resulting jerks of the vehicle, the high pressure fluctuations effected in quick succession in the brake system or circuit considerably infringed comfortable driving. Since in each control cycle the brake pressure sank from a high value to a relatively low one, the applied braking force was used inefficiently in order that the brake pressure is again increased to the preceding high value.

Therefore methods were suggested for influencing the brake pressure which also took into account the inertia of the hydraulic brake system, which decreased the number of the necessary control cycles per time unit, and which diminished the interval between the highest and lowest brake pressure occurring during a control cycle. In these processes the number of threshold deceleration values of the wheel deceleration and acceleration which are the criteria for the control action is higher.

According to the non-examined pre-published German application 1,655,380 the brake pressure is influenced as a function of the rotational deceleration and acceleration levels. When exceeding a lower rotational deceleration level, the brake pressure is kept constant by the available control means. Due to the inertia of the hydraulic device, the deceleration continues to increase and reaches a second upper rotational deceleration threshold value which produces a signal for pressure decrease in the wheel cylinder. The rotational deceleration passes a maximum, decreases again and sinks below this upper rotational deceleration level. At this point the brake pressure is again kept constant at the present value and the rotational deceleration continues to decrease and passes over into a rotational acceleration. When exceeding an acceleration threshold level, the brake pressure is kept constant until the reacceleration has passed a maximum and decreases again. If the acceleration level is transgressed downwards, a new pressure build-up is initiated. If the vehicle has nearly come to a standstill during the control cycle and the acceleration level is not reached, a timing member sees to the restoration of the normal state of the control means so that the brake system is prepared for the next brake action.

Due to the excessive energy previously applied in the brake system, in practice oscillations occur at the wheel suspension and, thus, in the rotational deceleration of the wheels during the control cycles following the first control cycle. It may happen in this case that during this transient period to a new rotational deceleration value, which changes continuously, the lower rotational deceleration threshold level is transgressed up- and downwards several times within short periods which is bound to lead to disturbances in the control unit.

Furthermore, the multiplied control steps are disadvantageous, and it would be desirable to reduce them to a minimum without giving up the obtained driving comfort and the braking efficiency, but instead increase them.

SUMMARY OF THE INVENTION

An object of the present invention is to provide an improved antiskid control system without the disadvantages of the prior art mentioned above, and which takes into consideration the transient actions in the control cycles following the first control cycle and which eliminates its effects and offers the necessary reliability and the desired comfortable driving when the control steps are reduced.

A feature of the presen invention is the provision of an antiskid brake control system comprising: a brake circuit for given wheels of a motor vehicle, the brake circuit including therein a brake pressure control means; a deceleration sensing means coupled to at least one of the given wheels to generate a rotational deceleration signal; and an electronic circuit means coupled to the sensing means and the control means to provide a first signal combination to control the control means to decrease the brake pressure in the brake circuit, a second signal combination following the first signal combination to control the control means to maintain constant the decreased brake pressure in the brake circuit and a third signal combination following the second signal combination to control the control means to return the brake circuit to its normal operation; each of the first, second and third signal combinations including a plurality of signals, each signal of the plurality of signals having a different characteristic derived from the deceleration signal.

Another feature of the present invention is the provision of the above mentioned first signal combination having a first signal indicating that the deceleration signal has achieved at least a given value and a second signal indicating that a predetermined speed change has occurred after the deceleration signal has achieved said given value.

Still another feature of the present invention is the provision of the above mentioned second signal combination having a first signal indicating when the deceleration signal equals zero and a second signal equal to a positive differential coefficient of the deceleration signal.

A further feature of the present invention is the provision of the above mentioned third signal combination having a first signal indicating when the deceleration signal equals zero and a second signal equal to a negative differential coefficient of the deceleration signal.

In one embodiment following the principles of the present invention the output of the rotational deceleration sensor is connected to an integrator, a first AND gate, a differentiator and an inverter. The output of the integrator is the second input of the AND gate the output of which is coupled to the set control inputs of two bistable devices. The outputs of bistable devices are connected to the final control member of the control system which is disposed in the brake circuit to control the brake pressure in the brake circuit. The differentiator is followed by two detectors for the determination of the downward or upward tendency of the deceleration curve. The output of the inverter and the output of one detector provide the inputs to a second AND gate and the output of the inverter and the output of the other detector provide the inputs to a third AND gate. The outputs of the second and third AND gates are each coupled to the reset input of a different one of the bistable devices.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENT

Figure 1:
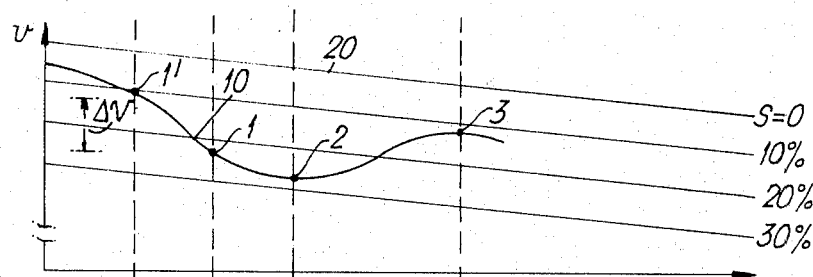
FIG. 1 illustrates a curve of the vehicle speed and the wheel rotational speed verses time during a brake action in accordance with the principles of the antiskid brake control system of the present invention.
Figure 5:
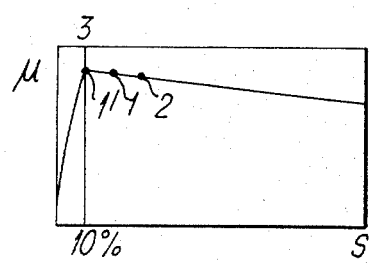
FIG. 5 illustrates a curve obtained from a set of curves of the μ-slip- curves, the switch positions of the brake pressure control means being indicated thereon in accordance with the principles of the present invention.

It is known that independent from the dominating road conditions the most effective braking with the shortest braking distance is possible within the relatively small slip range of 10 – 30 percent (see FIGS. 1 and 5). Therefore, it is desirable to keep the fluctuations of the wheel rotational speed $v$ created deliberately by an antiskid control system within this slip range, as illustrated in FIG. 1 by means of the wheel rotational speed Curve 10 in the parameter field of the slip. The Curve 20 represents the simultaneous curve of the vehicle speed $v$.

In order to reach the desired curve of the wheel rotational speed $v$ within a slip range of 10 – 30 percent the present invention initiates the pressure decrease and the pressure build-up in the brake circuit during a brake action according to the other criteria than employed in the prior art so that the control cycle is simplified, on the one hand, and that, on the other hand, disturbances in the control action are eliminated.

Figure 2:
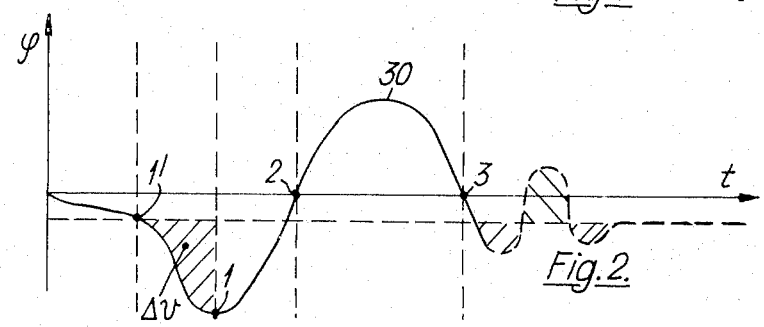
FIG. 2 illustrates a curve of the wheel rotating deceleration verses time corresponding to the speed curve of FIG. 1.
Figure 3:
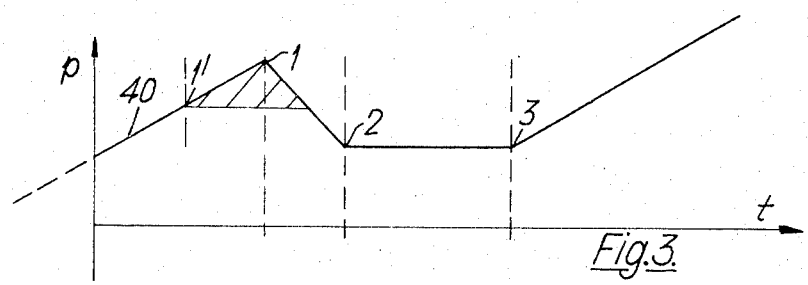
FIG. 3 illustrates the brake circuit pressure curve in the wheel brake cylinder of a brake circuit verses time occurring in the antiskid brake control system of the present invention corresponding to the speed and deceleration curves of FIGS. 1 and 2.

FIG. 2 represents the acceleration or deceleration curve 30 of the wheel, said acceleration or deceleration curve 30 corresponding to the wheel rotational speed Curve 10 in FIG. 1. FIG. 3 illustrates the brake pressure Curve 40 corresponding to Curves 10 and 30. Upon beginning braking, i.e., with increased pressure $p$, the wheel deceleration $\phi$ first increases slowly, but more than the vehicle deceleration decreases and reaches a predetermined deceleration level at point 1'. At this moment the slip is already slightly higher than 10 percent, as can be seen from FIG. 1 at point 1' of the speed Curve 10.

The friction value conditions for the braking are, as can be seen from FIG. 5, optimal for the given outward conditions. According to the principles known from the prior art the control system would engage here for the first time in the brake action and keep the brake pressure, e.g., constant. According to the invention, however, the deceleration value is accumulated in an electronic circuit means or system at point 1' in FIG. 2 and at the same time an integrator is actuated integrating the wheel deceleration $\phi$ over the time $t$ from point 1', while the pressure $p$ in the brake circuit continues to rise and the wheel deceleration $\phi$ increases more quickly.

Figure 4:
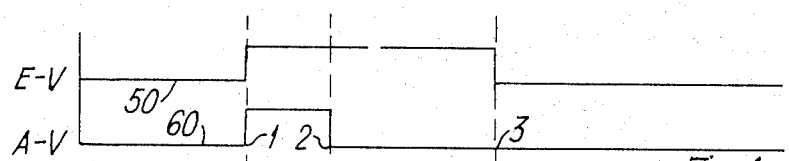
FIG. 4 illustrates two curves of the corresponding switch positions of the brake pressure control means of the antiskid brake control system of the present invention.

FIG. 1 shows that the wheel rotational speed $v$ can still drop by a certain amount $\Delta v$ in order to remain within th permissible slip range of 10 – 30 percent. This difference $\Delta v$ of the wheel rotational speed $v$ is determined by means of the above mentioned integrator. At point 1 of the wheel deceleration Curve 30 the integration value of the wheel deceleration $\phi$ over the time t from point 1' has reached the empirically determined amount $\Delta v$, represented as hatched area in FIG. 2. At point 1 a control signal combination is produced in the electronic circuit means by the two simultaneously occurring values, i.e., the deceleration level at point 1' and the speed difference $\Delta v$, said control signal acting on the final control member of the antiskid control system, or in other words the brake pressure control means present in the brake circuit, and causes the hydraulic separation of the wheel brake cylinder from the master cylinder as well as a pressure decrease in the part of the brake line connected with the wheel brake cylinder. These two control steps are represented in FIG. 4 by means of the Curves 50 ane 60. Curve 50 represents the hydraulic separation of wheel brake cylinder and master cylinder, while Curve 60 illustrates the control step for the pressure decrease. The two control elements which are switched according to these Curves 50 and 60 and which are in normal position at the beginning of the braking are brought into the switched position or condition at point 1 of the wheel deceleration Curve 10 as a consequence of the two simultaneously occurring signals mentioned above. While the brake pressure p in the wheel brake cylinder drops accordng to Curve 40 in FIG. 3 from point 1 in the direction of point 2, the wheel deceleratin $\phi$ passes its maximum and drops again due to the reduced brake pressure (see FIG. 2). The wheel rotational speed $v$ simultaneously approaching its minimum according to FIG. 1. The beginning of the pressure decrease is determined by the choice of the integration value $\Delta v$ such that the minimum of the wheel speed $v$ at point 2 of the wheel rotational speed Curve 10 still lies within the admissible slip range of 30 percent. The minimum of the wheel rotational speed $v$ at point 2 in FIG. 1 corresponds to the zero passage of the wheel deceleration or wheel acceleration at point 2 in FIG. 2 where the wheel deceleration passes over into an acceleration.

If the deceleration zero is determined at the sensor of the control system the logic circuit of the electronic circuit means produces a new control signal which again acts on the final control member of the control system located in the brake circuit. This control signal at point 2 continues to keep a first control element of the final control member, which caused the separation of wheel and main brake cylinder, in the switched position according to Curve 50 in FIG. 4, while the second control element of the final control member causing the pressure decrease according to Curve 60 in FIG. 4 is brought back into its normal position. In this position of the first and second control elements of the final control member starting from point 2, the brake pressure in the wheel brake cylinder or brake circuit is kept constant. Due to the inertia inherent in the hydraulic device the wheel acceleration $\phi$ increases from the zero passage at point 2 of the deceleration-acceleration-Curve 30 in FIG. 2, passes a maximum and drops again. Accordingly, the wheel speed $v$ increases within the admissible slip range and approaches the vehicle speed up to a maximum value which approximately corresponds to a slip of 10 percent, this being point 3 in FIG. 1. At this maximum of the wheel rotational speed of Curve 10, the wheel acceleration $\phi$ has dropped to zero again, and the wheel deceleration-acceleration Curve 30 has a zero passage in an opposite direction to that at point 2 at point 3 in FIG. 2. This zero value being determined at the sensor in the electronic circuit means, it produces a further control signal which — acting on the final control member — brings the first control element, which caused the separation of the wheel brake cylinder and master cylinder, into its normal position (see Curve 50, FIG. 4). Thus, a control cycle of the brake action is terminated, and the normal state of the braking device is reestablished. In all diagrams of the attached drawings the point 3 forms the end of one control cycle and the starting point of the following control cycle from which the brake pressure $p$ is increased again.

As described above the brake pressure p is still increased — if the wheel deceleration $\phi$ reaches the level value at point 1', until starting from this point 1' a certain speed decrease $\Delta v$ can be registered at the wheel although the wheel is already in the slip range of optimal braking at a slip of 10 percent. This, or in other systems the inertia inherent to the system, entails an additional braking force (p . V) being brought into the brake circuit, said additional braking force corresponding to the hatched area in FIG. 3, and entailing a surplus energy which cannot be spent during braking. This surplus energy is transmitted to the wheel suspension and the wheel axles of the vehicle and causes oscillations there which cause the already mentioned transient oscillation of the wheel deceleration at the beginning of all subsequent control cycles, as is illustrated by the broken line in FIG. 2. Here the special advantage of the present antiskid brake control system becomes obvious.

If the control were initiated only by the deceleration signal at point 1' in this part of every subsequent control cycle, several disturbing signals would act on the electronic circuit means as this deceleration level is transgressed upwards and downwards several times during the transient oscillation. Since the response of the electronic circuit means of this invention depends on the occurrence of a certain speed difference $\Delta v$ after the deceleration level is reached at point 1', these distrubing oscillations do not reach the first control member, since in the integrator the upper half wave is substracted from the lower half wave of each oscillation and, thus, the predetermined amount $\Delta v$ is only reached again if there is a real strong deceleration caused by the brake action.

As can be seen from the drawings, especially in FIGS. 1 and 5, in the operation of the antiskid control system of the present invention the wheel speed remains within a slip range during the whole control action. In this slip range the friction value conditions between the wheels and the road can be regarded as optimal. In the antiskid control system of the present invention in the optimal slip range, only three control steps are necessary per control cycle. Disturbing signals of the wheel deceleration which occur through oscillations at the chassis, no matter what the cause may be, do not reach the final control member, thus, a false response is prevented.

Figure 6:
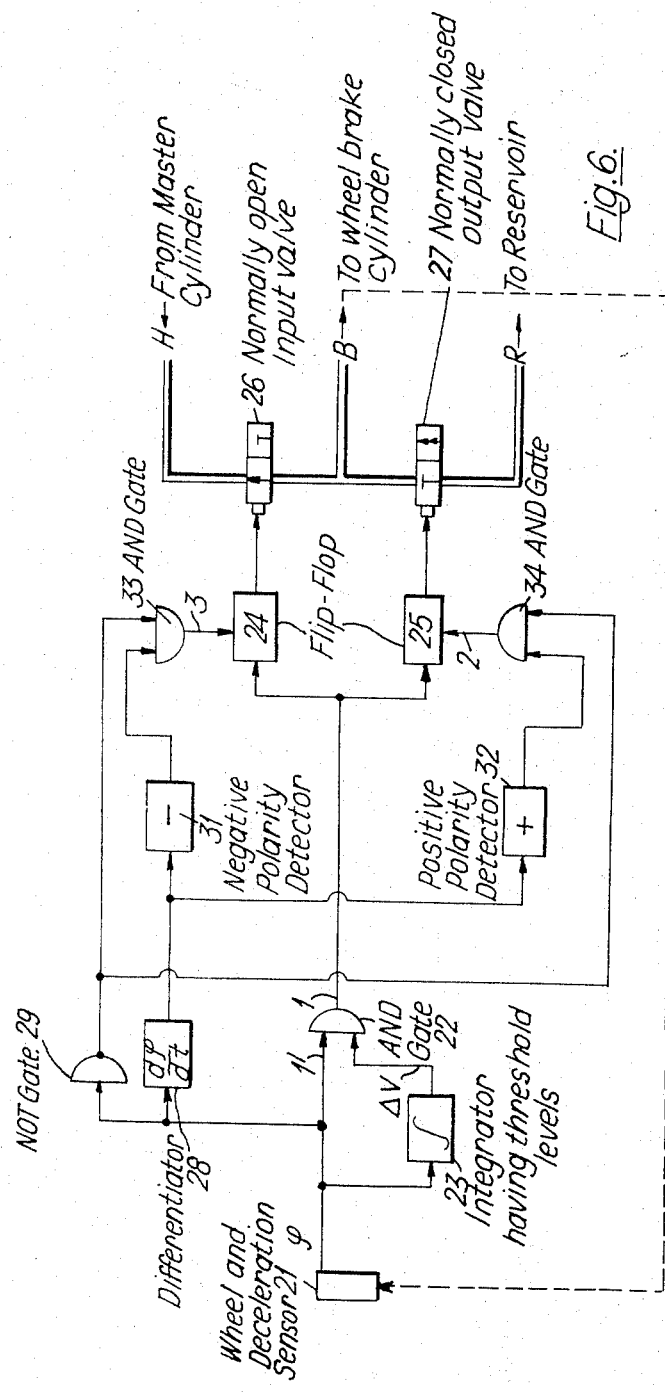
FIG. 6 illustrates in block diagram form one embodiment of the logic circuit in accordance with the principles of the present invention.

The block diagram of FIG. 6 illustrates one embodiment of an antiskid control system which operates according to the above mentioned inventive process.

The output signal $\phi$ of the deceleration sensor 21 is directly connected to an AND gate 22 and also to the input of an integrator 23 the output signal $\Delta v$ of which, as described above, controls the second input of AND gate 22. Integrator 23 includes therein a threshold level having a value corresponding to point 1'. If both input signals occur at AND gate 22 this member emits a signal which reverses (sets) two holding members, e.g., in the form of two bistable multivibrators (flip flops) 24 and 25. The set output signals of flip flops 24 and 25, shown at point 1 of both curves of FIG. 4 actuated the final control member (brake pressure control means) of the control circuit into a switched position or condition. The final control member is represented symbolically in the drawing by means of a normally open input valve 26 inserted in the hydraulic connection from the master cylinder H to the wheel brake cylinder B, and by means of a normally closed output valve 27 inserted in the hydraulic connection from the wheel brake cylinder B to the reservoir R. Other forms of the final control member are possible.

If both signals, i.e., the deceleration level $\phi$ and the speed difference $\Delta v$ (point 1 of FIG. 1 — FIG. 4) occur the input valve 26 is closed while the output valve 27 is opened, the pressure in the wheel brake cylinder B releases into the reservoir R, and the deceleration of the wheel decreases.

The output signal $\phi$ of deceleration sensor 21 is also connected to a differentiator 28 and a NOT gate 29 in order to enable the determination of the zero passages, namely, points 2 and 3, of the deceleration Curve 30. NOT gate 29 emits a signal if at sensor 21 the deceleration or acceleration zero is detected.

Differentiator 28 is followed by two polarity detectors 31 and 32 which determine the upward or downward tendency of the deceleration curve (FIG. 2). The outputs of these two detectors 31 and 32 are coupled together with the output of NOT gate 29 to each of the AND gates 33 and 34, the outputs of which are again connected to the reset input of the holding members or flip flosp 24 and 25.

If detector 32 determines an upward tendency (a positive polarity) of the deceleration curve (a positive differential coefficient of the deceleration signal) (FIG. 2) and if simultaneously a signal (point 2 of the curves in FIGS. 1 - 4) appears at the output of NOT gate 29, flip flop 25 is neutralized or reset through AND gate 34, and the output valve 27 returns into its normal position as shown at point 2, Curve A-V, FIG. 4. The pressure in the brake circuit will then be kept constant. If a downward tendency (a negative polarity) of the deceleration curve (a negative differential coefficient of the deceleration signal) is determined afterwards at detector 31 and if simultaneously there is a signal (point 3 of the curves in FIGS. 1-4) at the output of NOT gate 29, flip flop 24 is neutralized or reset through AND gate 34, as shown at point 3, Curve E-V, FIG. 4, and the input valve 26 returns into its normal position so that pressure can be built up again and a new control cycle starts.

While we have described above the principles of our invention in connection with specific apparatus it is to be more clearly understood that this description is made only by way of example and not as a limitation to the scope of our invention as set forth in the objects thereof and in the accompanying claims.

We claim:

1. An antiskid brake control system comprising:
a brake circuit for given wheels of a motor vehicle, said brake circuit including therein a brake pressure control means;
a deceleration sensing means coupled to at least one of said given wheels to generate a rotational deceleration signal; and
an electronic circuit means coupled to said sensing means and said control means to provide a first signal combination to control said control means to decrease the brake pressure in said brake circuit, a second signal combination following said first signal combination to control said control means to maintain constant the decreased brake pressure in said brake circuit and a third signal combination following said second signal combination to control said control means to return said brake circuit to its normal operation;
each of said first, second and third signal combinations including a plurality of signals, each signal of said plurality of signals having a different characteristic derived from said deceleration signal;
said second signal combination including
a first signal indicating when said deceleration signal equals zero, and
a second signal equal to a positive differential coefficient of said deceleration signal.

2. A sysem according to claim 1, wherein said first signal combination includes
a first signal indicating that said deceleration signal has achieved at least a given value, and
a second signal indicating that a predetermined speed change has occurred after said deceleration signal has achieved said given value.

3. A system according to claim 1, wherein said first signal combination includes
a first signal indicating that said deceleration signal has achieved at least a given value, and
a second signal which is a predetermined integrated value of said deceleration signal after said deceleration signal has achieved said given value.

4. An antiskid brake control system comprising:
a brake circuit for given wheels of a motor vehicle, said brake circuit including therein a brake pressure control means;
a deceleration sensing means coupled to at least one of said given wheels to generate a rotational deceleration signal; and
an electronic circuit means coupled to said sensing means and said control means to provide a first signal combination to control said control means to decrease the brake pressure in said brake circuit, a second signal combination following said first signal combination to control said control means to maintain constant the decreased brake pressure in said brake circuit and a third signal combination following said second signal combination to control said control means to return said brake circuit to its normal operation;
each of said first, second and third signal combinations including a plurality of signals, each signal of said plurality of signals having a different characteristic derived from said deceleration signal;
said third signal combination including
a first signal indicating when said deceleration signal equals zero, and
a second signal equal to a negative differential coefficient of said deceleration signal.

5. An antiskid brake control system comprising:
a brake circuit for given wheels of a motor vehicle, said brake circuit including therein a brake pressure control means;
a deceleration sensing means coupled to at least one of said given wheels to generate a rotational deceleration signal; and
an electronic circuit means coupled to said sensing means and said control means to provide a first signal combination to control said control means to decrease the brake pressure in said brake circuit, a second signal combination following said first signal combination to control said control means to maintain constant the decreased brake pressure in said brake circuit and a third signal combination following said second signal combination to control said control means to return said brake circuit to its normal operation;
each of said first, second and third signal combinations including a plurality of signals, each of said plurality of signals having a different characteristic derived from said deceleration signal;
said first signal combination including
a first signal indicating that said deceleration signal has achieved at least a given value, and
a second signal indicating that a predetermined speed change has occured after said deceleration signal has achieved said given value;
said second signal combination including
a third signal indicating when said deceleration signal equals zero, and
a fourth signal equal to a positive differential coefficient of said deceleration signal; and said third signal combination including
said third signal, and
a fifth signal equal to a negative differential coefficient of said deceleration signal.

6. A system according to claim 5, wherein said brake circuit includes
a first pressure medium line connected between the output of a master cylinder and a wheel brake cylinder associated with said one of said given wheels and, a second pressure medium line connected between said wheel brake cylinder and a pressure medium reservoir; and said control means includes a normally open input valve connected in said first line, and a normally closed output valve connected in said second line, said first signal combination actuating said input valve from its normally open condition to a closed condition and actuating said output valve from its normally closed condition to an open condition, said second signal combination actuating said output valve to return to its normally closed condition, and said third signal combination actuating said input valve to return to its normally open condition.

7. A system according to claim 6, wherein said electronic circuit means includes an integrator coupled to said sensing means having a threshold level equal to said given valve to produce said second signal, a first AND gate coupled to said sensing means and said integrator to produce said first signal combination, first and second bistable devices each of said bistable devices having two inputs, the output of one of said first and second bistable devices being coupled to said input valve for controlling the condition thereof and the output of the other of said first and second bistable devices being coupled to said output valve for controlling the condition thereof, one input of each of said first and second bistable devices being coupled to said first AND gate to set each of said first and second bistable devices to actuate said input valve to its closed condition and to actuate said output valve to its open condition, an inverter coupled to said sensing means to produce said third signal, a differentiator coupled to said sensing means, a positive polarity detector coupled to said differentiator to produce said fourth signal, a negative polarity detector coupled to said differentiator to produce said fifth signal, a second AND gate coupled to said inverter and said positive polarity detector to produce said second signal combination for coupling to the other input of said other of said bistable devices for reset thereof to actuate said output valve to its closed condition, and a third AND gate coupled to said inverter and said negative polarity detector to produce said third signal combination for coupling to the other input of said one of said bistable devices for reset thereof to actuate said input valve to its open condition.

8. An antiskid brake control system comprising:

a brake circuit for given wheels of a motor vehicle, said brake circuit including therein a brake pressure control means;

a deceleration sensing means coupled to at least one of said given wheels to generate a rotational deceleration signal; and an electronic circuit means coupled to said sensing means and said control means to provide a first signal combination to control said control means to decrease the brake pressure in said brake circuit, a second signal combination following said first signal combination to control said control means to maintain constant the decreased brake pressure in said brake circuit and a third signal combination following said second signal combination to control said control means to return said brake circuit to its normal operation;

each of said first, second and third signal combinations including a plurality of signals, each signal of said plurality of signals having a different characteristic derived from said deceleration signal;

said first signal combination including a first signal indicating that said deceleration signal has achieved at least a given value, and a second signal which is a predetermined integrated value of said deceleration signal after said deceleration signal has achieved said given value;

said second signal combination including a third signal indicating when said deceleration signal equals zero, and a fourth signal equal to a positive differential coefficient of said deceleration signal; and said third signal combination including said third signal, and a fifth signal equal to a negative differential coefficient of said deceleration signal.

9. A system according to claim 8, wherein said brake circuit includes a first pressure medium line connected between the output of a master cylinder and a wheel brake cylinder associated with said one of said given wheels, and a second pressure medium line connected between said wheel brake cylinder and a pressure medium reservoir; and said control means includes a normally open input valve connected in said first line, and a normally closed output valve connected in said second line, said first signal combination actuating said input valve from its normally open condition to a closed condition and actuating said output valve from its normally closed condition to an open condition, said second signal combination actuating said output valve to return to its normally closed condition, and said third signal combination actuating said input valve to return to its normally open condition.

10. A system according to claim 7, wherein said electronic circuit means includes an integrator coupled to said sensing means having a threshold level equal to said given value to produce said second signal, a first AND gate coupled to said sensing means and said integrator to produce said first signal combination, first and second bistable devices each of said bistable devices having two inputs, the output of one of said first and second bistable devices being coupled to said input valve for controlling the condition thereof and the output of the other of said first and second bistable devices being coupled to said output valve for controlling the condition thereof, one input of each of said first and second bistable devices being coupled to said first AND gate to set each of said first and second bistable devices to actuate said input valve to its closed condition and to actuate said output valve to its open condition, an inverter coupled to said sensing means to produce said third signal, a differentiator coupled to said sensing means, a positive polarity detector coupled to said differentiator to produce said fourth signal, a negative polarity detector coupled to said differentiator to produce said fifth signal, a second AND gate coupled to said inverter and said positive polarity detector to produce said second signal combination for coupling to the other input of said other of said bistable devices for reset thereof to actuate said output valve to its closed condition, and a third AND gate coupled to said inverter and said negative polarity detector to produce said third signal combination for coupling to the other input of said one of said bistable devices for reset thereof to actuate said input valve to its open condition.

* * * * *